(12) United States Patent
Boehringer et al.

(10) Patent No.: US 9,995,618 B2
(45) Date of Patent: Jun. 12, 2018

(54) CAPSULE-WEIGHING DEVICE, CAPSULE-FILLING MACHINE, AND METHOD FOR WEIGHING A CAPSULE

(71) Applicant: Robert Bosch GmbH, Stuttgart (DE)

(72) Inventors: Walter Boehringer, Remshalden (DE); Jens Schlipf, Freiberg A. N. (DE); Martin Vogt, Schorndorf (DE); Thomas Franck, Lorch-Weitmars (DE); Werner Runft, Winnenden (DE)

(73) Assignee: Robert Bosch GmbH, Stuttgart (DE)

( * ) Notice: Subject to any disclaimer, the term of this patent is extended or adjusted under 35 U.S.C. 154(b) by 523 days.

(21) Appl. No.: 14/414,133

(22) PCT Filed: May 15, 2013

(86) PCT No.: PCT/EP2013/059983
§ 371 (c)(1),
(2) Date: Jan. 12, 2015

(87) PCT Pub. No.: WO2014/009040
PCT Pub. Date: Jan. 16, 2014

(65) Prior Publication Data
US 2015/0204714 A1  Jul. 23, 2015

(30) Foreign Application Priority Data
Jul. 10, 2012  (DE) ........................ 10 2012 212 033

(51) Int. Cl.
*G01G 17/00*  (2006.01)
*B65B 1/04*  (2006.01)
(Continued)

(52) U.S. Cl.
CPC .............. *G01G 17/00* (2013.01); *A61J 3/074* (2013.01); *B65B 1/04* (2013.01); *B65B 7/28* (2013.01); *G01G 7/06* (2013.01); *A61J 2200/74* (2013.01)

(58) Field of Classification Search
None
See application file for complete search history.

(56) References Cited

U.S. PATENT DOCUMENTS 3,978,640 A * 9/1976 Crossley ................... A61J 3/07
53/282
4,147,618 A * 4/1979 Richardson ............... B07C 5/16
177/1
(Continued)

FOREIGN PATENT DOCUMENTS

DE 102004029431 B3 * 2/2006 ............. G01G 17/00
DE 102008037986      3/2010
(Continued)

OTHER PUBLICATIONS

International Search Report for Application No. PCT/EP2013/059983 dated Aug. 19, 2013 (English Translation, 2 pages).

*Primary Examiner* — Hemant M Desai
*Assistant Examiner* — Tanzim Imam
(74) *Attorney, Agent, or Firm* — Michael Best & Friedrich LLP

(57) ABSTRACT

The present invention relates to a capsule-weighing device (1) comprising a capsule holder (2) for receiving at least one capsule lower part (4), preferably for medical preparations, a weighing unit (5) that can be positioned independently of the capsule holder (2) and that has at least one first electrode (8) for weighing the capsule lower part (4) in the capsule holder (2), a transport device (3) for moving the capsule holder (2), independently of the weighing unit (5), to different stations (S1-S12), and at least one second electrode
(Continued)

(9), wherein an outer wall (7) of the at least one capsule lower part (4) is exposed in the capsule holder (2), or is only thinly enclosed by the capsule holder (2), such that, by means of an electric field between the first and second electrodes (8, 9), the capsule lower part (4) can be weighed without moving the capsule lower part (4) in the capsule holder (2).

9 Claims, 6 Drawing Sheets

(51) Int. Cl.
*B65B 7/28* (2006.01)
*A61J 3/07* (2006.01)
*G01G 7/06* (2006.01)

(56) References Cited

U.S. PATENT DOCUMENTS

| | | | | |
|---|---|---|---|---|
| 4,216,837 A * | 8/1980 | Pryor | ............... | G01G 9/005 177/1 |
| 4,223,751 A * | 9/1980 | Ayers | ............... | B07C 5/16 177/210 C |
| 5,018,335 A * | 5/1991 | Yamamoto | ............... | A61J 3/074 53/281 |
| 5,135,113 A * | 8/1992 | Mayer | ............... | B07C 5/02 177/210 C |
| 5,515,740 A * | 5/1996 | Gamberini | ............... | A61J 3/074 177/119 |
| 5,660,029 A * | 8/1997 | King | ............... | A61J 3/075 141/391 |
| 5,750,938 A * | 5/1998 | De Caris | ............... | G01G 7/06 177/50 |
| 7,694,497 B2 * | 4/2010 | Tagliavini | ............... | A61J 3/074 53/452 |
| 2008/0053211 A1 * | 3/2008 | Gamberini | ............... | G01G 7/06 73/149 |
| 2008/0127609 A1 | 6/2008 | Tagliavini et al. | | |
| 2008/0134629 A1 * | 6/2008 | Schmied | ............... | A61J 3/074 53/55 |
| 2008/0219803 A1 * | 9/2008 | Runft | ............... | G01G 17/00 414/21 |
| 2008/0256908 A1 * | 10/2008 | Frabetti | ............... | A61J 3/074 53/502 |
| 2009/0026373 A1 * | 1/2009 | Mertens | ............... | B30B 11/005 250/339.07 |
| 2010/0078093 A1 * | 4/2010 | Ansaloni | ............... | A61J 3/074 141/284 |
| 2010/0164144 A1 * | 7/2010 | Kuhnle | ............... | A61J 3/074 264/334 |
| 2012/0207272 A1 * | 8/2012 | Runft | ............... | A61J 3/074 378/57 |

FOREIGN PATENT DOCUMENTS

| | | | | |
|---|---|---|---|---|
| DE | 102009028372 | | 2/2011 | |
| DE | 102009028372 A1 * | | 2/2011 | ............... A61J 3/074 |
| EP | 1982686 | | 10/2008 | |
| EP | 1982687 | | 10/2008 | |

* cited by examiner

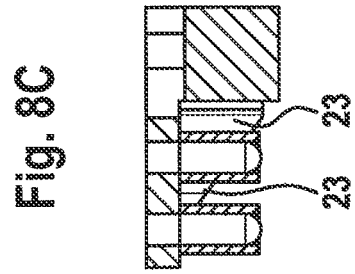
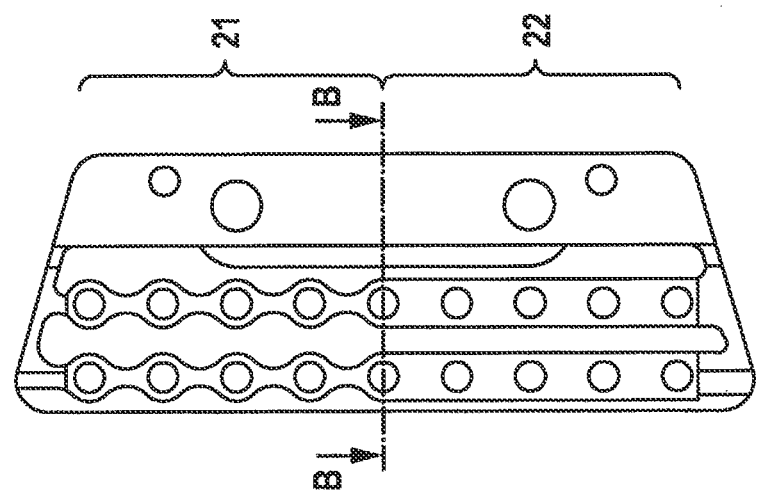
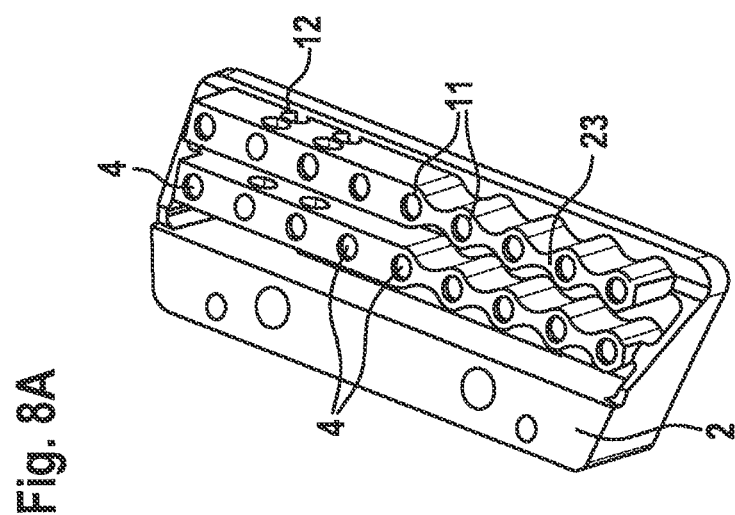

CAPSULE-WEIGHING DEVICE, CAPSULE-FILLING MACHINE, AND METHOD FOR WEIGHING A CAPSULE

BACKGROUND OF THE INVENTION

The present invention relates to a capsule-weighing device, and to a capsule-filling machine comprising the capsule-weighing device. A method for weighing a capsule is also disclosed. The capsule is filled in particular with medical preparations.

When filling capsules, in particular with medical preparations, there are many situations in which the empty capsule, the partially filled capsule or the completely filled capsule has to be weighed. Several of the capsules, or of the capsule lower parts, are usually inserted into a capsule holder. The capsule holder transports the capsule lower parts to the individual stations for filling and closing the capsules. DE 11 2005 002 354 T5 discloses a sensor system for weighing purposes, which sensor system is completely integrated in the capsule holder. The capsule holder in this case is not stationary at one place but instead moves through the entire filling machine. This previously known system is very complex, since additional measures are needed for supplying power and transmitting data to the capsule holder. In EP 1 982 686, the capsule lower parts are weighed inside the capsule holder. In this case, however, the capsule lower parts are pushed upward by means of a ram. This leads to not inconsiderable measuring inaccuracies. Furthermore, handling of the capsule is critical, since it must be assumed that capsules that are not round or that are sticky will not automatically slide back into the capsule receiver.

SUMMARY OF THE INVENTION

With the capsule-weighing device according to the invention, the capsule-filling machine and the method, it is possible that each capsule lower part inserted into the capsule holder is weighed individually, without the capsule lower part moving relative to the capsule holder. In addition, according to the invention, the weighing unit is separate from the transport unit and the capsule holder, such that the structure is simple and requires only low maintenance. It is a stationary weighing unit, or a weighing unit that can be moved and positioned independently of the capsule holder. Thus, ideally, only one weighing unit is needed for an entire capsule-filling machine. This one weighing unit can be used at various locations on the capsule-filling machine. According to the invention, the capsule lower part remains securely and free of movement in the capsule holder. The capsule lower part does not have to be removed from and placed back into the capsule holder, and therefore a potential source of error is eliminated. The net weight of each filled capsule lower part can be determined individually. The arrangement according to the invention permits individual weighing of each empty capsule lower part and also of each capsule lower part after partial or complete filling. The medium introduced into the capsule is not measured before the filling procedure. According to the invention, the medium is weighed after the filling procedure, i.e. in the capsule lower part. All these advantages are achieved by the fact that, on the one hand, the weighing unit is separate from the capsule holder and, on the other hand, the capsule lower parts are received in the capsule holder in such a way that an outer wall of the capsule lower parts is either partially exposed or is enclosed by only a very thin wall of the capsule holder. The weighing device is provided with at least one electrode per capsule lower part to be measured. By virtue of the special design of the capsule holder, at least one electrode of the weighing unit can be driven to a capsule lower part and thus generate an electric field in order to determine the weight. In detail, the capsule-weighing device comprises a capsule holder for receiving at least one capsule lower part. Preferably, the capsule holder is designed to receive a multiplicity of capsule lower parts, in particular more than three capsule lower parts. Independently of the capsule holder, a weighing unit with at least a first electrode is provided for weighing the capsule lower parts on the capsule holder. In particular, one first electrode is provided per capsule lower part. By means of a transport device, the capsule holder can be moved, independently of the weighing unit, to various stations, for example an insert station, a filling station and a closing station. To generate the electric field for measuring the capsule lower part, a second electrode is needed as a counterpart to the first electrode. As is explained later in more detail, this second electrode is formed either on the capsule holder or on the weighing unit. The seat in the capsule holder for the individual capsule lower parts is so configured that the outer wall of each capsule lower part is either exposed or is enclosed by only a very thin wall of the material of the capsule holder. It is thereby possible for a first electrode to come very close to each capsule lower part. An exact measurement is thus made possible. The measurement by means of the electric field takes place particularly by using the two electrodes as capacitor or by what is called the relaxation measurement. Both methods are described in DE 2008 037 986 A1.

In particular, provision is made that the capsule holder comprises, for each capsule lower part to be received, a dedicated thin-walled pot. In particular, the pot has, at the lower end and/or on its circumferential surface, at least one aperture. The design of these pots permits a very exact movement of the weighing unit to the capsule lower parts.

For a measurement that is as exact as possible, provision is made that the material thickness of the capsule holder between electrode and capsule lower part, i.e. in particular the material thickness of the abovementioned pots, is at most 3 mm, preferably at most 1.5 mm, particularly preferably at most 0.5 mm.

The capsule holder is preferably designed such that at least the areas responsible for receiving the capsule are made from materials which permit good capacitive measurement or the like. That is to say, at least the portions of the capsule holder that touch the capsule lower part are electrically non-conductive, preferably made of plastic.

Preferably, both the first electrode and also the second electrode are located on the weighing unit. One first electrode and one second electrode are provided for each capsule lower part that is to be weighed. The weighing unit is driven to the capsule holder in such a way that a capsule lower part is in each case located between a first electrode and a second electrode.

In an alternative configuration, provision is made that the second electrode is formed in the capsule holder. In this case, when the weighing unit is driven to the capsule holder, only the first electrode has to be brought into contact with the pot or directly with the capsule part.

In a preferred embodiment, provision is made that a sealed space arises when the weighing unit is placed onto the capsule holder. At least the contact point between the first electrode and the pot or the capsule lower part is located in this sealed space. By means of a vacuum pump, an underpressure is generated in the sealed space. A very exact measurement is thus made possible. The vacuum is applied to ensure that the capsule bears securely with a defined force on the electrode. This force can be generated by the vacuum. Alternatively, however, this force can be generated by using compressed air from above or by some other means, e.g. by a spring or the like.

The invention further comprises a capsule-filling machine. The advantageous embodiments described in the context of the capsule-weighing device according to the invention are accordingly applied advantageously to the capsule-filling machine according to the invention. The capsule-filling machine comprises at least one of the capsule-weighing devices. Furthermore, the capsule-filling machine comprises an insert station for inserting the capsule lower parts into the capsule holder. By means of the capsule holder, the capsule lower parts are transported inside the capsule-filling machine. A filling station serves for filling the capsule lower part. At a closing station, a capsule upper part is placed onto the capsule lower part. There are preferably a plurality of filling stations in the capsule-filling machine. Different preparations, in particular medical preparations, are introduced into the capsule lower part at the individual filling stations. Weighing of the capsule lower part may be necessary at various locations inside the capsule-filling machine. For example, the empty capsule lower part has to be weighed before the first filling. Likewise, after complete or partial filling, the capsule lower part has to be weighed in order to check whether the desired amount of the individual preparation is in the capsule lower part. Therefore, the weighing unit can be driven to the capsule holder at the individual stations and/or between the stations. Alternatively, the capsule holder can also be driven to the weighing unit. During weighing, there is no movement of the capsule lower parts in the capsule holder.

The weighing unit can be installed one or more stations before the filling station in order to determine the tare weight, and/or one or more stations later in order to determine the gross weight. If the weighing unit is used directly under a filling station, the tare weight can be measured first, after which the filling takes place and, subsequently, the measurement of the gross weight, such that the net weight can be determined, or the weighing unit is set to "0" on taring, such that the filling weight can be determined directly after filling.

The invention further comprises a method for weighing a capsule. The advantageous embodiments described in the context of the capsule-weighing device and capsule-filling machine are accordingly applied advantageously to the method according to the invention. In the method, a capsule holder with at least one inserted capsule lower part is made available. In particular, several capsule lower parts are inserted. The capsule lower part remains in the capsule holder during filling, transporting and closing.

In the next step, a weighing unit is driven to the capsule holder and/or the capsule holder is driven to the weighing unit for weighing the at least one capsule lower part with an electric field. The capsule lower part remains motionless in the capsule holder.

Particularly preferably, the capsule holder is designed, for the capsule-weighing device, for the capsule-filling machine and for the method according to the invention, such that two or more capsule lower parts can be received therein. For this purpose, the weighing unit is designed such that at least two of the capsule lower parts, preferably all of the capsule lower parts, can be weighed at the same time.

BRIEF DESCRIPTION OF THE DRAWINGS

Illustrative embodiments of the invention are described in detail below with reference to the accompanying drawing, in which:

FIG. 8A shows an isometric view from below of a capsule holder for the capsule-weighing device according to the invention in a fifth illustrative embodiment, FIG. 8B is a plan view of the capsule holder shown in FIG. 8A, FIG. 8C is a view taken along line B-B in FIG. 8B.

DETAILED DESCRIPTION

Structural parts that are identical or have an identical function are provided with the same reference signs in all of the illustrative embodiments.

A first illustrative embodiment of a capsule-weighing device 1 is described below with reference to FIGS. 1 to 3.

Figure 7:
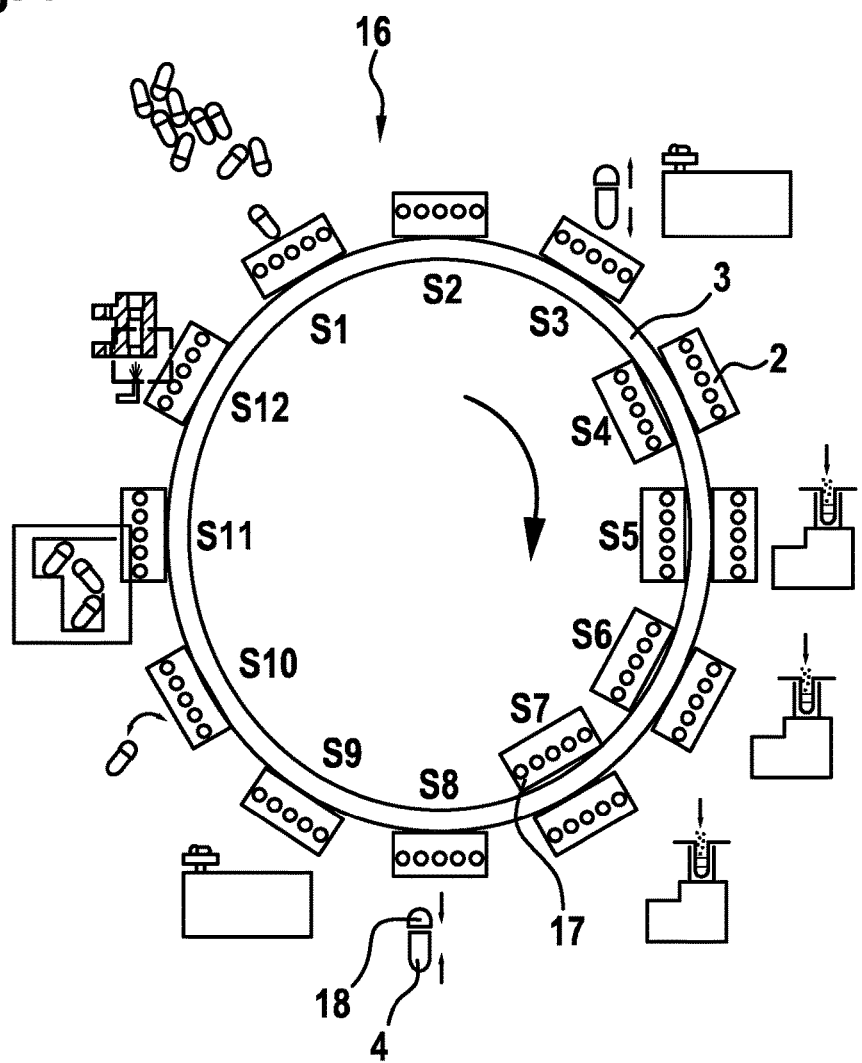
FIG. 7 shows a capsule-filling machine according to the invention in a fourth illustrative embodiment.

The capsule-weighing device 1 comprises a capsule holder 2 which, by means of a transport device 3, can be moved to various stations S1 to S12 (see FIG. 7) of a capsule-filling machine 16 (see FIG. 7). The capsule holder 2 has a plurality of pots 11. Capsule lower parts 4 are inserted into these pots 11. The capsule lower parts 4 are filled in particular with medical preparations and closed.

A further component part of the capsule-weighing device 1 is a weighing unit 5, which can be moved and positioned independently of the capsule holder 2. In the example shown, the weighing unit 5 comprises a first electrode 8 and a second electrode 9 per capsule lower part 4 and per pot 11.

Figure 1:
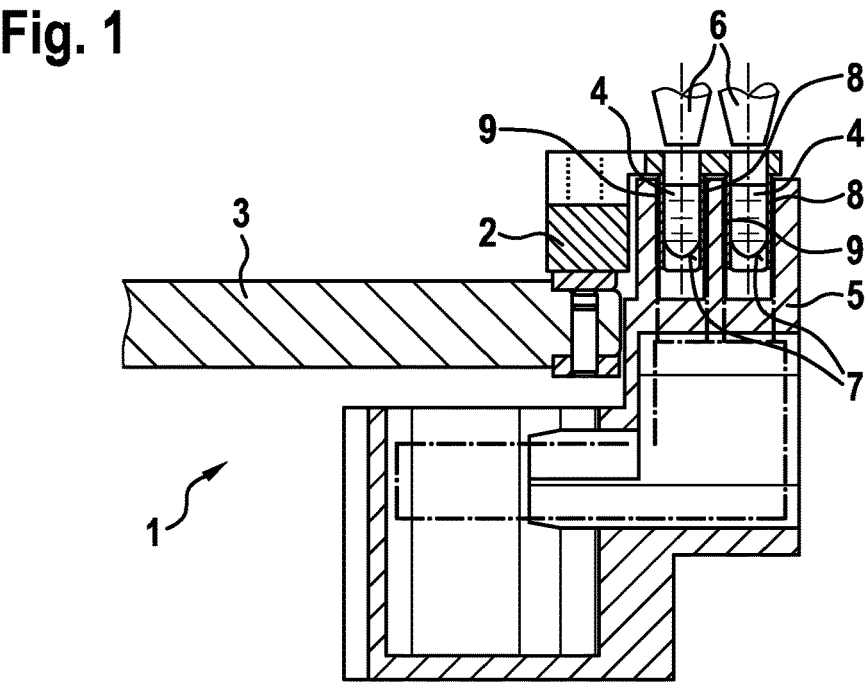
FIG. 1 shows a first sectional view of a capsule-weighing device according to the invention in a first illustrative embodiment.
Figure 2:
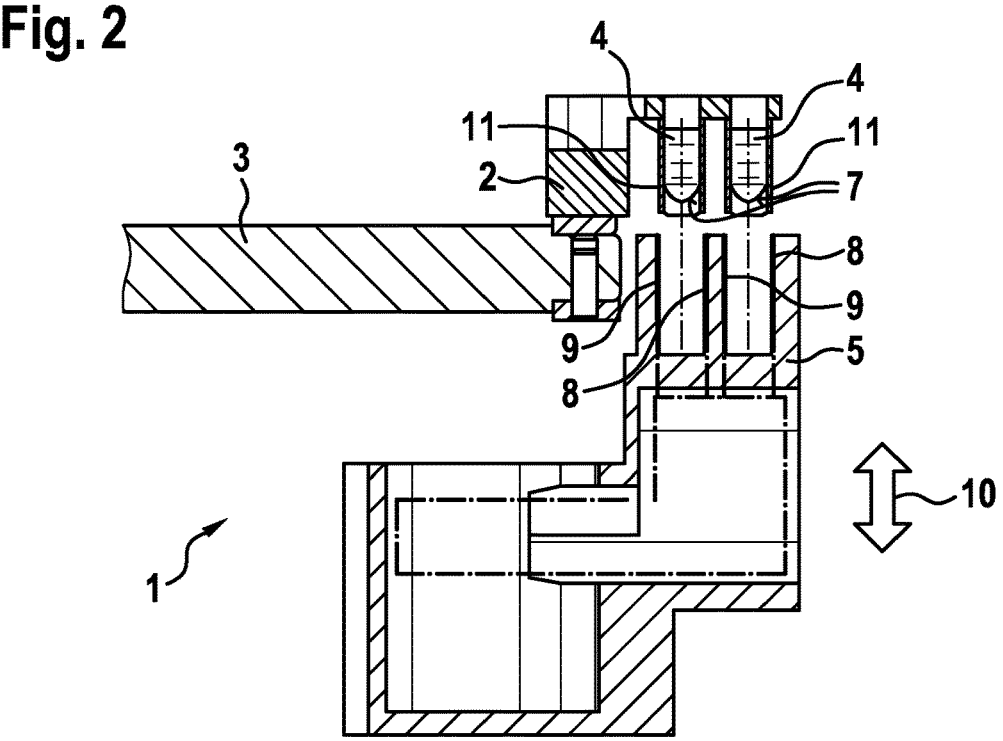
FIG. 2 shows a second sectional view of the capsule-weighing device according to the invention in the first illustrative embodiment.

FIG. 1 shows the capsule-weighing device 1 at a filling device 6 of a filling station S5 to S7 (see FIG. 7). In FIG. 1, the weighing unit 5 is located in a position in which weighing of the capsule lower parts 4 is possible. In FIG. 2, the weighing unit 5 is located in a position before and after weighing. FIG. 2 indicates the corresponding feed movement 10 that is needed in order to drive the electrodes 8, 9 directly to the pots 11 or the capsule lower parts 4.

Figure 4:
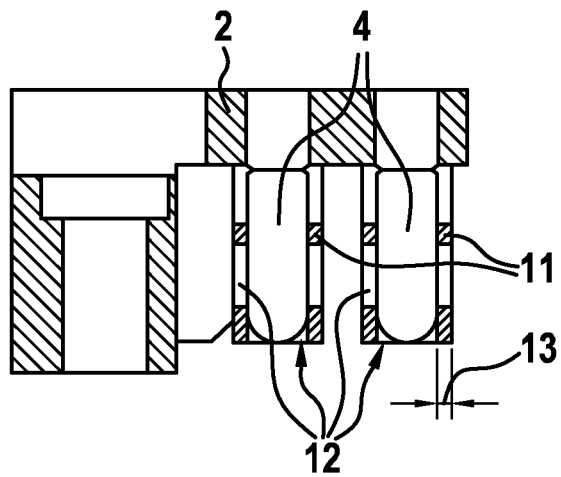
FIG. 4 shows a detail of the capsule-weighing device according to the invention in a second illustrative embodiment.

The capsule lower parts 4 each have an outer wall 7. With this outer wall 7, the capsule lower parts 4 are received with a form fit and/or force fit in the capsule holder 2, in particular in the pots 11. The pots 11 are designed such that the outer wall 7 is partially exposed and/or is enclosed only by extremely thin material of the pots 11. A suitably small material thickness 13 of the pots 11 is shown in FIG. 4. By virtue of this design of the pots 11, the electrodes 8, 9 can be brought extremely close to the capsule lower parts 4.

Figure 3:
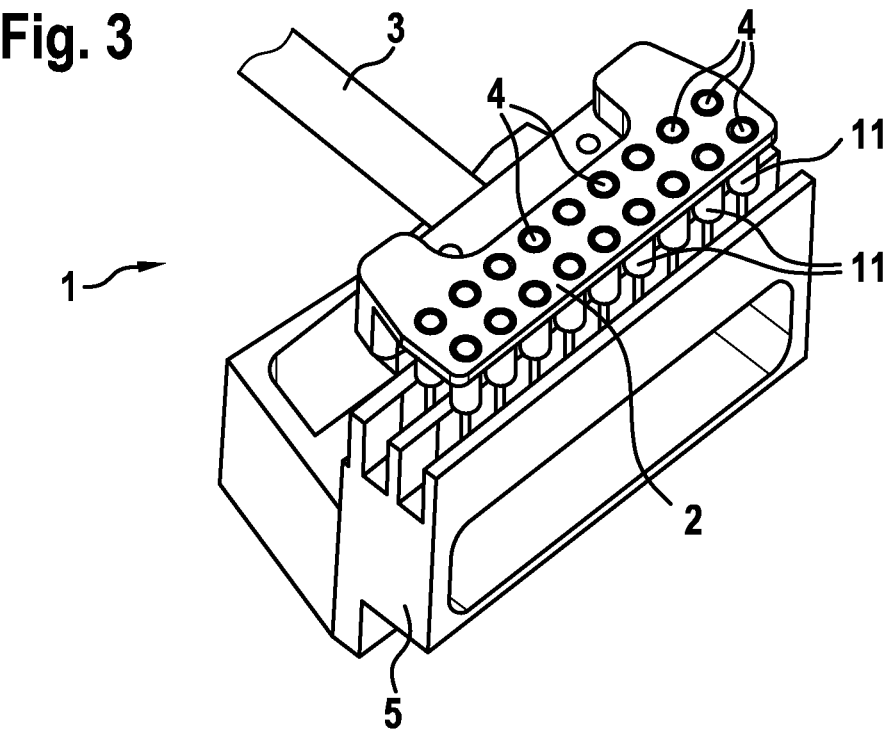
FIG. 3 shows an isometric view of the capsule-weighing device according to the invention in the first illustrative embodiment.

FIG. 3 shows an isometric view of the capsule-weighing device 1 according to the first illustrative embodiment. It shows that pots 11 are provided in a capsule holder 2. A capsule lower part 4 sits in each of the pots 11. By means of the weighing unit 5, each capsule lower part 4 can be separately weighed simultaneously.

FIG. 4 shows in detail a second illustrative embodiment of the capsule-weighing device 1. In the second illustrative embodiment, the pots 11 have several apertures 12 both at the lower end and also on the circumferential surface. Through these apertures 12, the capsule lower parts 4 can be still better measured by means of the electric field between the two electrodes 8, 9.

Figure 5:
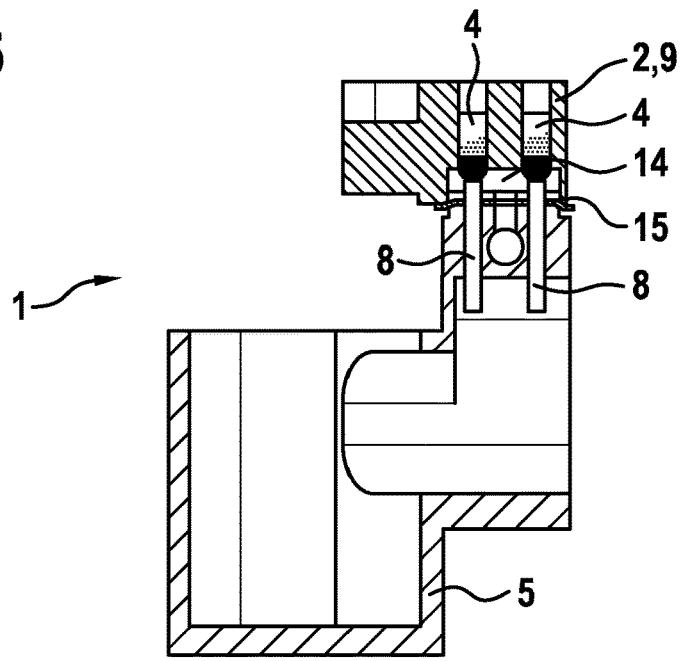
FIG. 5 shows a first sectional view of the capsule-weighing device according to the invention in a third illustrative embodiment.
Figure 6:
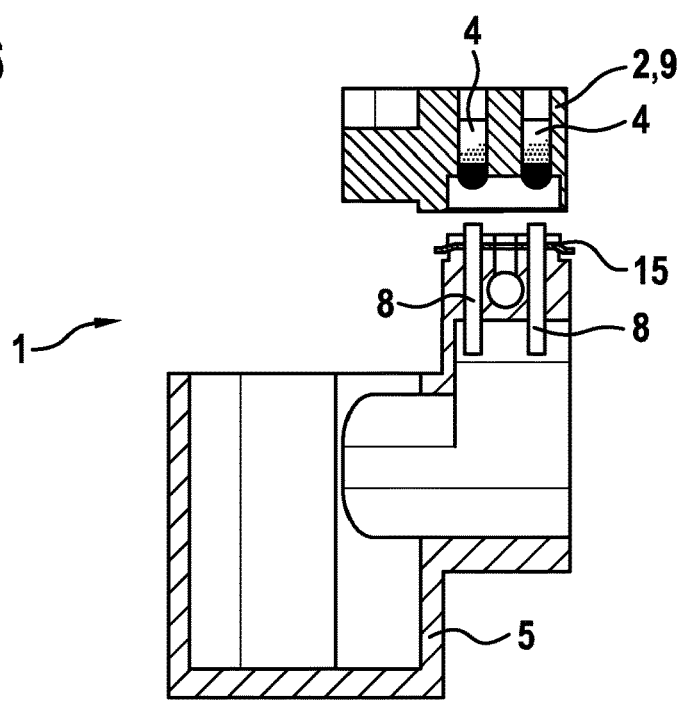
FIG. 6 shows a second sectional view of the capsule-weighing device according to the invention in the third illustrative embodiment.

FIGS. 5 and 6 show a third illustrative embodiment of the capsule-weighing device 1. In FIG. 5, the weighing unit 5 is located in a position for measuring the capsule lower parts 4. In FIG. 6, the weighing unit 5 is located in a position before or after weighing.

In the third illustrative embodiment, the second electrode 9 is formed in the capsule holder 2. Accordingly, the weighing unit 5 comprises only first electrodes 8. The weighing unit 5 is provided with one first electrode 8 per capsule lower part 4 or per pot 11. The lower ends of the capsule lower parts 4 lie exposed in the pots 11 or in the capsule holder 2. For weighing purposes, the weighing unit 5 is driven upward, such that in each case a first electrode 8 is driven to a lower end of the capsule lower parts 4. The weighing unit 5 comprises a sealing lip 15. By means of this sealing lip 15, a sealed space 14 is closed between capsule holder 2 and weighing unit 5. The contact point between capsule lower parts 4 and first electrodes 8 is located in this sealed space 14. By means of a vacuum pump (not shown), underpressure can be generated in the sealed space 14 and, in this way, the measuring accuracy can be increased.

FIG. 7 shows a capsule-filling machine 16 according to a fourth illustrative embodiment, comprising one of the capsule-weighing devices 1 described above. Structural parts that are identical or have an identical function are provided with the same reference signs in all of the embodiments.

FIG. 7 shows that, in the capsule-filling machine 16, the capsules are moved in a circle by means of the transport device 3. The capsule upper parts 18 are transported in the holder 17 shown, while the capsule lower parts 4 are being filled.

Stations S1 to S12 are passed through. At station S1, the capsules are inserted into the capsule holder 2. At stations S2 and S3, the capsules are weighed (tare) and a capsule upper part 18 is removed from the capsule lower part 4. At stations S5 to S7, the capsule lower parts 4 are filled. At station S8, the capsule upper part 18 is placed onto the capsule lower part 4. At station S9, the completely filled capsules are weighed. At station S10, defective capsules are rejected. At station S11, capsules are removed from the capsule holder 2. At station S12, the capsule holder 2 is cleaned.

To keep FIG. 7 simple, the weighing of the capsules is represented by a symbolic balance. In actual fact, however, the weighing of the capsule lower part 4 with the capsule-weighing device 1 according to the invention is carried out at various locations in the capsule-filling machine 16, for example at the individual stations S1 to S12 or between the stations. Of course, the capsule upper part 18 can also be placed on the capsule lower part 4 during this weighing procedure.

FIG. 8 shows two variants of the design of the capsule holder 2. On the left-hand side, FIG. 8 shows an isometric view of the capsule holder 2 from below. A plan view and a sectional view are shown on the right-hand side.

The illustration in FIG. 8 shows two different variants of the design of the capsule holder 2. The area 21 indicates a first variant. The area 22 indicates a second variant. In both variants 21, 22, different webs 23 are used to stiffen the pots 11. As the two variants 21, 22 show, different webs 23 can be formed both transversely and also longitudinally between the pots 11 in order to stiffen the latter. The webs 23 are arranged such that one of the above-described weighing units 5 can always be moved with the corresponding electrodes 8, 9 as close as possible to the pots 11.

Figure 9A:
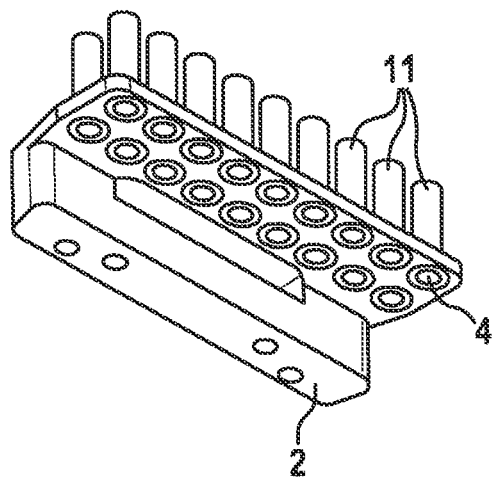
FIG. 9A shows an isometric view from below of a capsule holder for the capsule-weighing device according to the invention in a sixth illustrative embodiment.
Figure 9B:
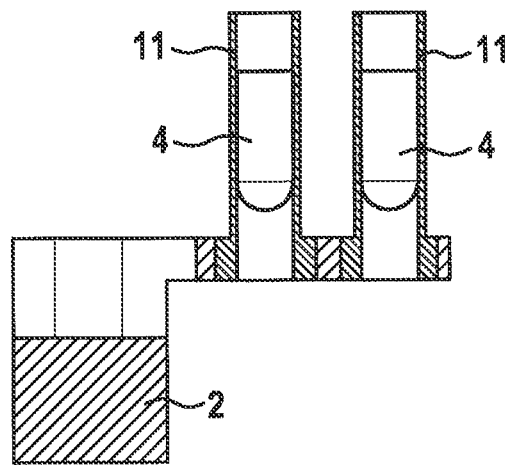
FIG. 9B is a sectional view of the capsule holder shown in FIG. 9A.

FIG. 9 shows the design of the capsule holder 2 according to a sixth illustrative embodiment. An isometric view of the capsule holder 2 is shown in the upper area of FIG. 9. A sectional view is shown in the lower area. According to FIG. 9, the pots 11 can also extend upward on the capsule holder 2. Accordingly, the weighing unit 5 is driven to the pots 11 from above and/or from the side.

As the various illustrative embodiments and variants of the invention show, it is essential that the capsule lower parts in the pots 11 are exposed as far as possible, such that the electrodes 8, 9 of the weighing unit 5 can be brought as close as possible to them.

What is claimed is:

1. A capsule-weighing device, comprising
   a capsule holder for receiving a capsule lower part, wherein the capsule holder includes a dedicated pot into which the capsule lower part is inserted, wherein there is at least one aperture on a circumferential side wall of the pot,
   a weighing unit that is configured to be positioned independently of the capsule holder and that has at least one first electrode for weighing the capsule lower part in the capsule holder,
   a transport device for moving the capsule holder, independently of the weighing unit, to different stations, and
   at least one second electrode,
   wherein an outer wall of the capsule lower part is exposed in the capsule holder via the at least one aperture, such that, by means of an electric field that passes between the first and second electrodes and through the at least one aperture, the capsule lower part is configured to be weighed without moving the capsule lower part in the capsule holder.

2. The capsule-weighing device as claimed in claim 1, characterized in that the pot is thin-walled such that the outer wall of the capsule lower part is only thinly enclosed by the capsule holder.

3. The capsule-weighing device as claimed in claim 1, characterized in that the weighing unit comprises the at least one second electrode.

4. The capsule-weighing device as claimed in claim 1, characterized in that the pot is electrically non-conductive.

5. The capsule-weighing device as claimed in claim 1, characterized in that the capsule holder comprises the at least one second electrode.

6. The capsule-weighing device as claimed in claim 1, characterized by a sealed space which arises when the weighing unit is placed onto the capsule holder, and a vacuum pump for generating an underpressure in the sealed space.

7. The capsule-weighing device as claimed in claim 1, characterized in that the pot is made of plastic.

8. The capsule-weighing device as claimed in claim 1, wherein the at least one aperture includes a plurality of apertures on the circumferential side wall of the pot, and wherein the plurality of apertures are diametrically opposed such that the electric field passes through the plurality of apertures.

9. A capsule-filling machine comprising
a capsule-weighing device as claimed in claim 1,
an insert station for inserting a capsule lower part into the capsule holder,
a filling station for filling the capsule lower part, and
a closing station for placing a capsule upper part onto the capsule lower part,
wherein, at any of the insert station, the filling station, and the closing station or between any two of the insert station, the filling station, and the closing station, the weighing unit is configured to be driven to the capsule holder and/or the capsule holder is configured to be driven to the weighing unit, in order to weigh the capsule lower part without a movement of the capsule lower part in the capsule holder.

\* \* \* \* \*